July 21, 1931. J. W. ROGERS 1,815,678
TRAILER HITCH
Filed June 20, 1929 2 Sheets-Sheet 1

Inventor
Joseph W. Rogers

By Clarence A. O'Brien
Attorney

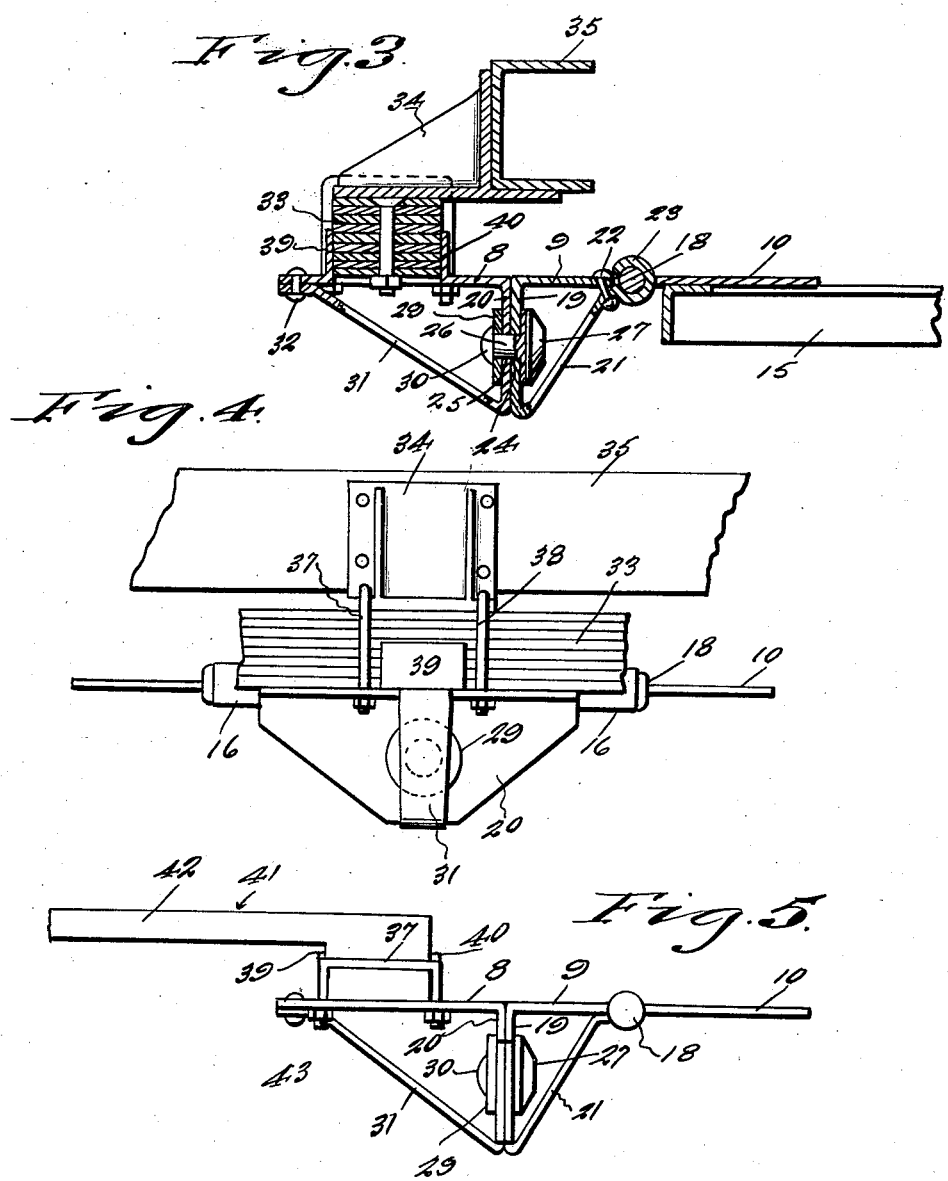

Patented July 21, 1931

1,815,678

UNITED STATES PATENT OFFICE

JOSEPH W. ROGERS, OF BODINES, PENNSYLVANIA

TRAILER HITCH

Application filed June 20, 1929. Serial No. 372,491.

This invention relates to trailer hitches and is particularly adapted for attaching trailers to automobiles for carrying luggage while touring.

An object of the invention is to provide a device of the character referred to, which is free of lateral movement so as to prevent side sway of the trailer and furthermore to provide for pulling the trailer on a fixed axis of rotation so that the trailer will be governed during forward or rearward movement of the automobile pulling the trailer.

Further objects of the invention are to provide in a manner as hereinafter set forth, a tractor of the character referred to, which is strong, compact, thoroughly reliable for its intended purpose, very simple in its method of assembly, thoroughly reliable in its operation, and comparatively inexpensive to manufacture and install.

With the foregoing and other objects in view, the invention consists in the novel construction, combination and arrangement of parts as will be hereinafter more specifically described and illustrated in the accompanying drawings, wherein is disclosed an embodiment of the invention, but it is to be understood that changes, variations and modifications may be resorted to, without departing from the spirit of the claim hereunto appended.

In the drawings, wherein like reference characters denote corresponding parts throughout the several views:

Figure 3 is a vertical section in detail, taken substantially on the line 3—3 of Figure 2.

Figure 4 is a rear elevation of the device illustrating the method of attaching to one type of automobile, and Figure 5 is a side elevation of the device in accordance with this invention, showing a modified form of coupling the device with a different type of automobile, shown in Figure 4.

Figure 1:
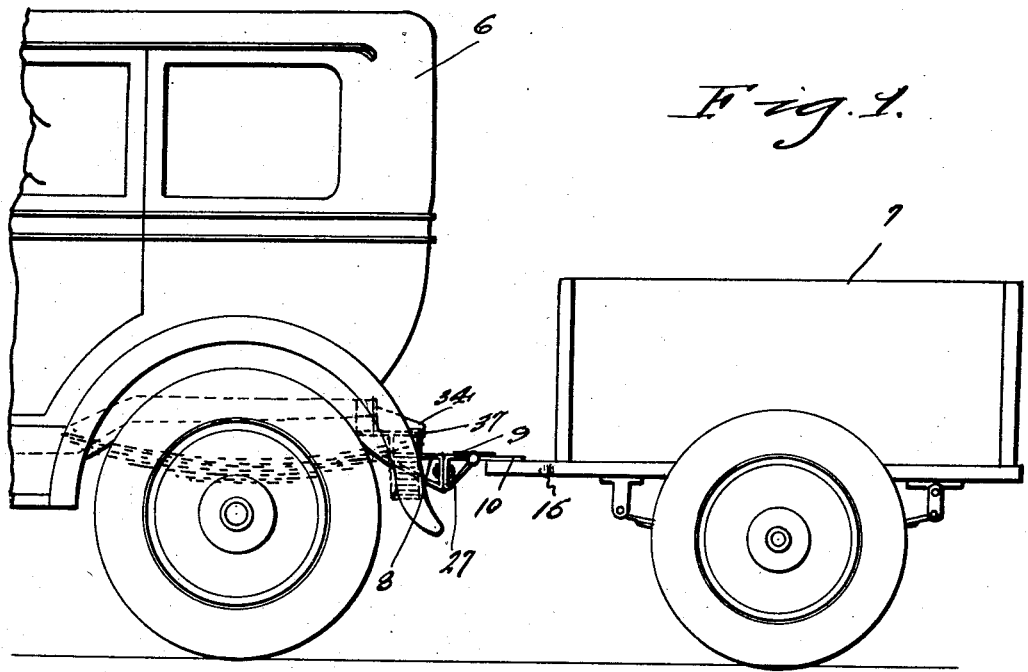
Figure 1 is a fragmentary side elevation of an automobile and illustrating the device in accordance with this invention coupling the trailer with the automobile.

Considerable difficulty has been experienced heretofore in coupling trailers with automobiles by reason of the fact that in order to have an efficient coupling, a lateral play was provided therein. Lateral play in the coupling produces all kinds of annoyances, such as trailers disposed at an angle to the automobile pulling the same when muddy roads are encountered. Another annoying feature of providing lateral play in the coupling is the fact that the trailer cannot be governed in traffic to pass through narrow spaces, while at the same time, by providing lateral play in the coupling, the trailer cannot be backed with any kind of precision control thereof.

Bearing the foregoing in mind, and referring particularly to the drawings, wherein the present invention is disclosed, 6 indicates an automobile. 7 designates a two-wheel tractor coupled to the automobile with the device in accordance with this invention. The device, in accordance with the present invention consists of three plates 8, 9, and 10. The rear plate 10 is of rhomboidal configuration and is formed of metal of suitable thickness. The angular sides 11, 12, are riveted adjacent the margins thereof as at 13, 14, and to the extension 15, projecting forwardly from and secured to the trailer 7. Co-extensive with the forward edge of the rear plate 10 are secured a plurality of forwardly projecting transversely spaced sleeves 16, which mesh with a plurality of rearwardly extending sleeves 17 that are secured to the rear edge of the intermediate plate 9. The inner meshing sleeves 16 and 17 are provided with registering openings, in which is journaled the bolts 18, the bolt 18 journaled in the sleeves 16, 17, providing a hinged connection between the forward end of the rear plates and the rear ends of the intermediate plates, coextensive with the edges thereof and compensate for differences in level between the trailer 7 and the automobile 6.

At the forward end of the intermediate plate 9, the body portion is bent downwardly at right angles to form a flange 19 and the rear end of the body portion of the plate 8 is bent downwardly at right angles to form a flange 20, movably abutting the flange 19. The flanges 19 and 20 are co-extensive with the forward edge of the intermediate plate 9, the rear edge of the forward plate 8. A diagonally disposed reinforcing strap 21 extends from the outer edge of the flange 19 and the inner end thereof is rigidly secured to the plate 9, by means of a rivet 22, whereby the flange is prevented from bending. The extreme end of the strap 21 is bent in a circle to form the sleeve 23, which not only gives additional support to the strap 21, but also provides additional strength for the hinged connection.

At approximately the center, each of the flanges 19 and 20 are provided with registering openings 24, 25, through which extends the shank of the pin 26, having a flattened head 27 connected therewith and in movable abutment with the rear face of the flange 19. A washer 29 is mounted on the shank of the bolt 26, and is in abutting relation to the forward face of the flange 20 and the head 30 of the pin 26. The pin 26 provides for rotating the plates 8, 9, with respect to each other on a fixed axis and the flanges 19, 20, prevent lateral thrust in the event that the openings 24, 25, become worn and therefore would otherwise permit lateral thrust by reason of the wear.

The plates 8, 9, are normally disposed in the same plane when the trailer and automobile are upon the same level, but when the trailer rocks upon its axis caused by ruts or unevenness in the roads, the pin 26 provides compensation for the rocking movement, but by reason of being on a fixed axis will prevent any lateral thrust of the trailer.

It is pointed out that there is a straight longitudinal pull from the automobile, through this coupling device, without any lateral deviation being permitted, and the reinforcing strap 31 extends from the outer end of the flange 20 and the forward end of said strap is riveted as at 32, to the forward edge of the forward plate 8.

Figure 2:
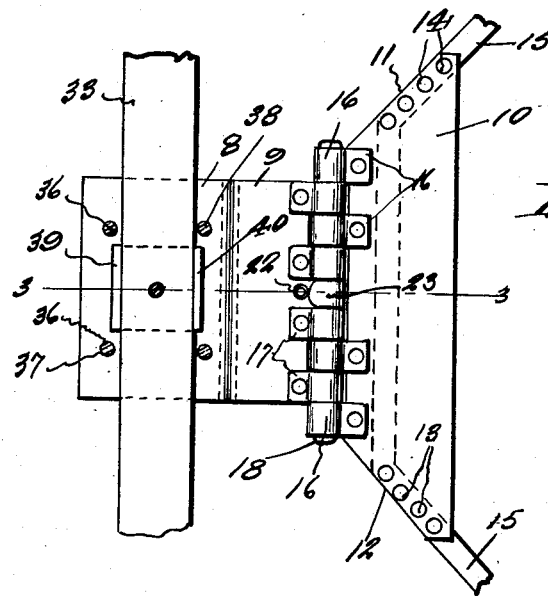
Figure 2 is a top plan view of the device in accordance with this invention.

In coupling the forward plate 8 to the rear constructions of automobiles of the type shown in Figures 1, 2, 3, and 4, wherein the transversely extending spring 33 is secured at its center to a bracket 34, connected to a channel 35 secured between the side bars of the chassis frame, the plate 8 is provided with four openings through which extend the threaded ends of the pair of shackle bolts 37, 38, by which the spring is supported on the bracket 34. Since the automobile industry has standardized the size of springs, the plate 8 may be pre-formed with transversely disposed upwardly extending flanges 39, 40, at the center thereof to prevent the spring from shifting when seated therebetween. The flanges 39, 40, by making an I-shaped slot at the center and bending the body portion defined by these slots to form the said flanges, whereby very economical manufacturing practice is promoted. Flanges 39, 40, are disposed between the four openings 36, through which the shackle bolts extend. The shackle bolts 37, 38, have nuts threadably secured thereon in rigid abutment against the under face of the plate 8, whereby the shackle bolts are rigidly held and at the same time supports the forward plate 8 in rigid connection with the rear end of the automobile.

Before connecting the coupling in accordance with the present invention to an automobile that has no convenient cross bar, the modified form of the invention shown in Figure 5 is to be utilized. A T-shaped bar indicated generally as at 41, has the stem 42 secured to the chassis frame, centrally thereof and is provided at its rear end with oppositely disposed legs 43, about which the shackle bolts similar to those shown at 37 and 38 may be coupled. In the latter case, all that is necessary to do to make the device adaptable to this type of automobile is to provide a shorter shackle bolt and secure the bar 41 to the chassis frame. It is furthermore pointed out, that in the type shown in Figure 5 of the drawings, the upstanding flanges 39, 40, overhang the opposite faces of the legs of the car to prevent movement thereof and also to provide a seat for the legs.

It is to be understood that by describing the details in any particular form, structure or arrangement, it is not intended to limit the invention beyond the terms of the claim or the requirements of the prior art.

What is claimed is:

In combination with an automobile and a trailer, a horizontally arranged plate rigidly connected to the front end of the trailer and having a plurality of hinge barrels at its front edge, spaced apart, an intermediate plate having a depending flange at its front edge and a plurality of hinge barrels at its rear edge extending into the spaces between the first-mentioned barrels, a hinge pin passing through the barrels for connecting the intermediate plate with the first-mentioned plate, a brace member having one end connected to the lower edge of the flange and its other end bent over the hinge pin, means for fastening the brace member adjacent its bent end to the intermediate plate, a third plate attached to a part of the automobile and having a depending flange at its rear edge abutting the flange on the intermediate plate, a horizontal pivot passing thru the flanges at the center thereof and a brace connecting the lower edge of the flange on the third plate to a part of the front of said third plate.

In testimony whereof I affix my signature.

JOSEPH W. ROGERS.